(12) United States Patent
Moriyama et al.

(10) Patent No.: US 7,422,042 B2
(45) Date of Patent: Sep. 9, 2008

(54) METHOD AND APPARATUS FOR CENTERING A LOG

(75) Inventors: Nobuyuki Moriyama, Aichi (JP);
Kazuhito Mawatari, Aichi (JP);
Fumihiro Mizutani, Aichi (JP);
Yukinobu Kuno, Aichi (JP); Katsuya Matsumoto, Aichi (JP); Masaru Koike, Aichi (JP)

(73) Assignee: Meinan Machinery Works, Inc., Aichi (JP)

( * ) Notice: Subject to any disclaimer, the term of this patent is extended or adjusted under 35 U.S.C. 154(b) by 218 days.

(21) Appl. No.: 10/827,311

(22) Filed: Apr. 20, 2004

(65) Prior Publication Data

US 2004/0211490 A1 Oct. 28, 2004

(30) Foreign Application Priority Data

Apr. 25, 2003 (JP) ............................. 2003-121393

(51) Int. Cl.
*B23Q 15/00* (2006.01)

(52) U.S. Cl. ...................................... 144/394; 144/404

(58) Field of Classification Search ................. 144/356, 144/382, 394, 398, 402–404, 209.1, 215.2
See application file for complete search history.

(56) References Cited

U.S. PATENT DOCUMENTS

| | | | |
|---|---|---|---|
| 4,197,888 A | 4/1980 | McGee et al. ........... 144/209 A |
| 4,397,343 A * | 8/1983 | Fields ...................... 144/215.2 |
| 4,549,587 A | 10/1985 | Hasegawa et al. ........ 144/209 R |
| 4,811,776 A | 3/1989 | Bolton et al. ................ 144/357 |
| 4,884,605 A * | 12/1989 | Ely ............................. 144/357 |
| 5,449,030 A | 9/1995 | Mutsuura et al. ............ 144/357 |
| 5,582,224 A | 12/1996 | Mutsuura et al. ......... 144/215.2 |
| 6,116,306 A * | 9/2000 | Ely ............................. 144/416 |
| 6,176,282 B1 | 1/2001 | Nakamura et al. |
| 6,219,585 B1 * | 4/2001 | Hughes et al. .............. 700/167 |

FOREIGN PATENT DOCUMENTS

| | | |
|---|---|---|
| EP | 0 967 058 A2 | 12/1999 |
| JP | 6-293002 | 10/1994 |

* cited by examiner

*Primary Examiner*—Shelley Self
(74) *Attorney, Agent, or Firm*—Westerman, Hattori, Daniels & Adrian, LLP.

(57) ABSTRACT

An apparatus for centering a log to allow an optimum yield axis and a maximum radius of rotation of the log to be calculated more accurately than conventionally possible. The angle of rotation of a log M is detected by a rotation angle detector that is engaged with a preliminary axis c about which the log M is rotated. A contour of the log for calculating the optimum yield axis of the log and a contour for calculating the maximum radius of rotation of the log are measured separately. The contour for calculating the optimum yield axis is measured in a fixed-point manner by measuring the log at a plurality of certain measurement points with beam reflection scanners. The contour for calculating the maximum radius of rotation is measured in a comprehensive manner using swing-angle detectors engaged with contact-swinging detection members provided individually in the plural measurement sections.

6 Claims, 11 Drawing Sheets

METHOD AND APPARATUS FOR CENTERING A LOG

BACKGROUND OF THE INVENTION

1. Technical Field

The present invention relates to a method and apparatus for centering a log.

2. Background Art

When a log is peeled on a veneer lathe, it is necessary to accurately determine the position of optimum yield axis in order to improve the rate at which continuous veneer sheets can be obtained, or the yield of veneer sheets. For this purpose, it is considered effective and practical to rotate the log about a preliminary axis and then measure the contour of the log at, preferably, at least the vicinity of either end thereof or, more preferably, at the vicinity of a center portion of the log as well as the ends thereof. If necessary, such as when the log is of a great length exceeding 2 m, the contour is also measured at an intermediate portion between each end and the center portion (namely, at one location each towards the left and right of the log). Then, based on the resultant contour data (shapes, relative positional relationships, etc.), a desired optimum yield axis is calculated.

Further, in order to reduce the time in which the log is idling, while avoiding the collision between the log and the knife carriage, it is necessary to determine the maximum radius of rotation of the log and set the knife carriage at a proper standby position each time the log is peeled. It would be convenient if the maximum radius of rotation of the log can be determined simultaneously with the position of the optimum yield axis. However, the maximum radius of rotation of the log cannot be determined unless the optimum yield axis is set. Further, if the contour of the log is not measured at a sufficiently large number of points along the axis of the log (i.e., if there is too much area that is not measured), the log could collide with the knife carriage. Therefore, the contour of the log must be measured at a sufficiently large number of points.

Specifically, as shown in FIGS. 6(a) and (b), in the case where a log A has a uniform contour (diameter=D, with a portion of the log having a concave portion A2 on its periphery), if a optimum yield axis is set at a position a in FIG. 6(a), for example, the largest number of continuous veneer sheets would be obtained from a portion of the log indicated at A3. However, in this case, many narrow veneer sheets with inappropriate widths (in a direction perpendicular to the direction of the fibers) would be produced at portions A4, thereby decreasing the yield of veneer sheets. On the other hand, if the optimum yield axis is set at a position b in FIG. 6(b), the quantity of continuous veneer sheets that can be obtained from a portion indicated at A5 would be smaller than in the example (a), while only a small number of veneer sheets with smaller width would be produced from a portion A6. Thus, in the case of FIG. 6(b), the yield of veneer sheet would be higher than in the example (a). Further, if the optimum yield axis is set at an intermediate position, which is not shown, between the positions of the aforementioned two examples, both the rate at which continuous veneer sheets can be obtained and the yield of veneer sheets would be somewhere between those of the two previous examples. Thus, the characteristics of the veneer sheets that are produced vary even in a log with a uniform contour, depending on at which position the optimum yield axis is set.

Figure 6:
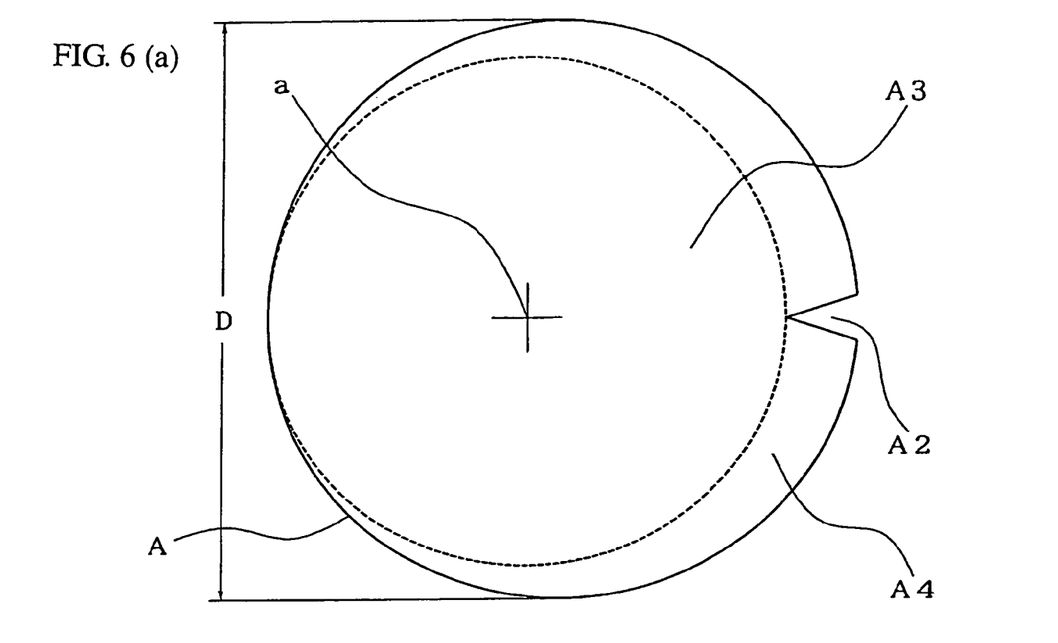
FIG. 6 is a schematic side view illustrating an example of a method of determining a optimum yield axis of a log.

Thus, it is desirable to determine the position of optimum yield axis based on the size of the individual contours that are measured and their relative positional relationships, such that desired characteristics of veneer sheets can be obtained. In general, the optimum yield axis is most often set at a position such that a maximum number of continuous veneer sheets can be obtained, as shown in FIG. 6(a) However, the techniques whereby the optimum yield axis is set at the position (b) of FIG. 6 or the aforementioned intermediate position have also been put to practical use. Thus, the preferable position of optimum yield axis is not always constant even when the log has a uniform contour.

If the optimum yield axis is set at the position (b) in the example of FIG. 6, the maximum radius of rotation of the log would be D/2, whereas if the optimum yield axis is set at the position (a), the maximum radius of rotation would be larger than D/2. It will be seen, therefore, that the maximum radius of rotation of a log is dependent on the position of its optimum yield axis, namely the former cannot be determined unless the latter is set.

Figure 7:
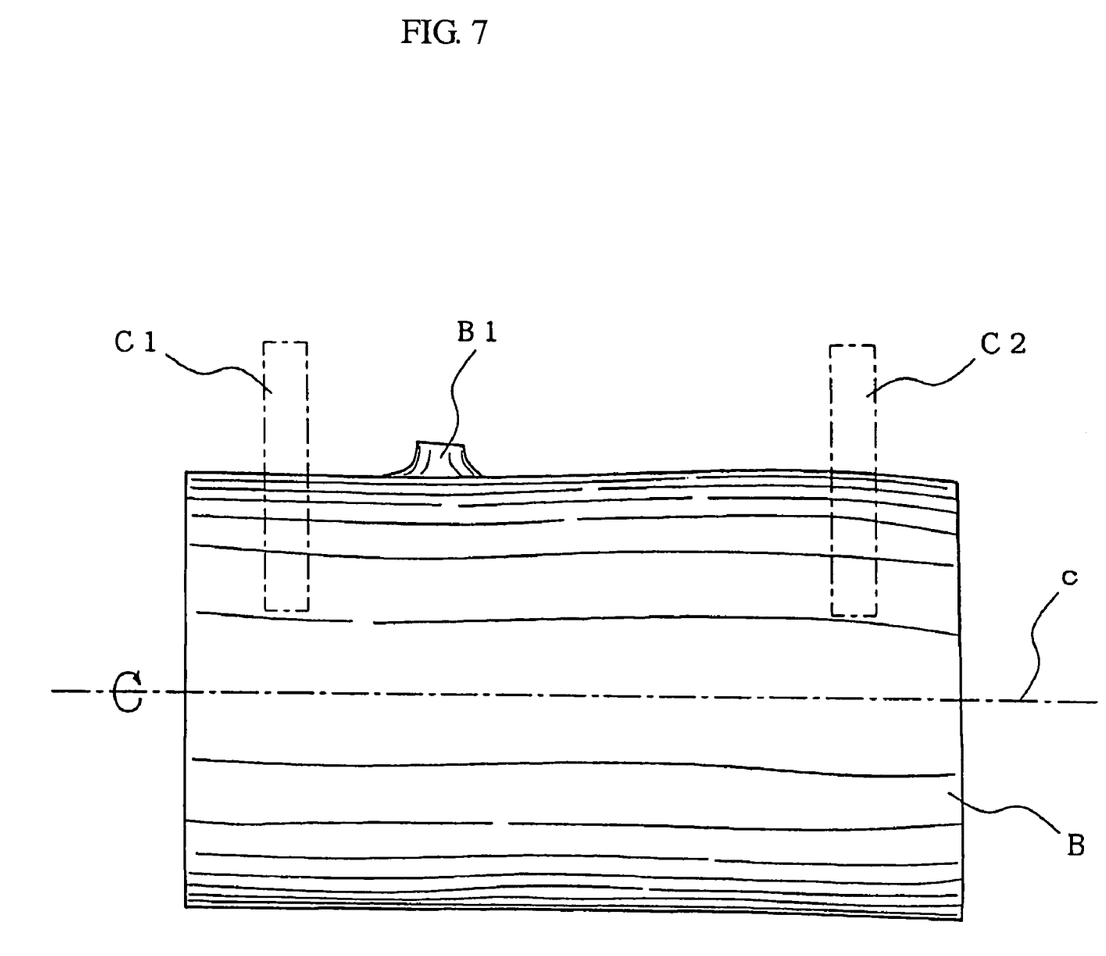
FIG. 7 is a schematic elevational view illustrating a method of centering a log according to the prior art.

Now referring to FIG. 7, for the determination of the optimum yield axis of a log B, the log B is rotated about a preliminary axis c, and then the contour of the log B is measured by appropriate measuring devices C1 and C2 disposed in the vicinity of each end of the log B. By so doing, a minimum required condition for the measurement of the log can be satisfied, and in fact such measurement technique has been proposed and implemented. However, this type of measurement of the contour of the log is not capable of measuring the contour of the log at a convex portion B1 between measuring devices C1 and C2, which is formed by a branch or similar projection, so that it cannot determine the maximum radius of rotation of the log B simultaneously. If the knife carriage is set at a position that is determined on the basis of the result of measurement by the measuring devices C1 and C2, the convex portion B1 could possibly collide with the knife carriage. In other words, in order to determine the maximum radius of rotation of the log, the contour of the log must be measured at a sufficiently large number of positions along the axis of the log. In reality, the knife carriage is set at a standby position with some extra rearward distance provided so that the aforementioned problem can be avoided. This measure, however, reduces the availability factor of the veneer lathe.

In the case of the above-described manner of measurement, the contour of concave portions as well as convex portions that exist between the measuring devices cannot be measured. However, as far as the determination of the maximum radius of rotation is concerned, data concerning the contour of concave portions is not needed and its absence does not cause any problems. Specifically, there is no chance that a concave portion, if any, of the log would collide with the knife carriage of the lathe. Therefore, even if the contour data about the concave portion was not available, it does not pose any problem in determining the maximum radius of rotation of the log. This fact that the absence of data regarding the contour of any concave portions of the log does not pose any problem at least in determining the maximum radius of rotation is an exceptional matter in all types of measurement of the log, including the method and apparatus of centering a log according to the invention. For the determination of the optimum yield axis of the log suitable for the peeling thereof, it is still desirable to obtain appropriate contour data including that of concave portions.

A method of centering a log whereby the optimum yield axis suitable for the peeling of the log and the maximum radius of rotation can be determined together is proposed in JP Patent Publication (Kokai) No. 6-293002) entitled "Method and apparatus for centering and supplying a log". According to this method, "a plurality of contour detectors are disposed on a log with substantially no gap provided therebetween along the length of the log, which is rotated once about a preliminary axis. Based on contour data obtained from at least two of the contour detectors, the optimum yield axis suitable for the peeling of the log is determined. Based on contour data provided by all of the contour detectors, the maximum radius of rotation of the log with respect to the optimum yield axis that has been determined is determined."

SUMMARY OF THE INVENTION

In the aforementioned method of centering a log according to the prior art, the optimum yield axis suitable for the peeling of the log and the maximum radius of rotation are determined based on the contour data provided by a plurality of common contour detectors. Each configuration of the contour detectors disclosed in the prior art has either some defects or shortcomings, thereby adversely affecting the accuracy of the resultant contour data, for example. Thus, the method is not practical.

Figure 8:
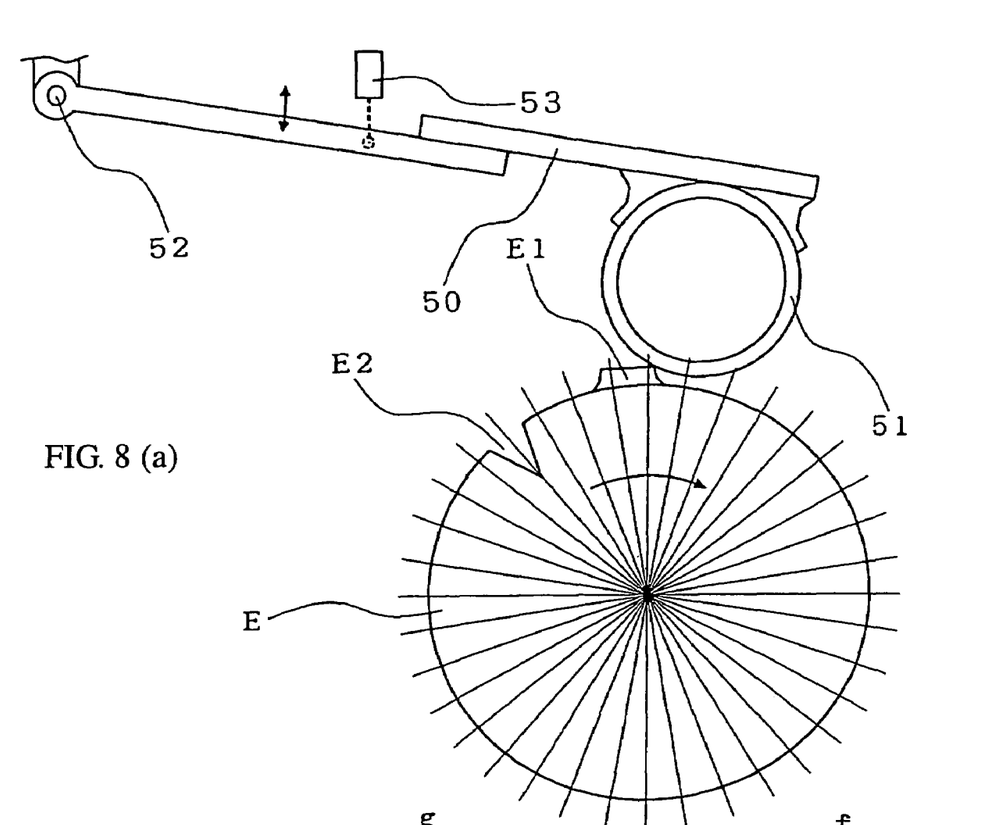
FIG. 8 is a schematic side view illustrating another method of centering a log according to the prior art.

Specifically, in an example of the contour detector according to the prior art, a contact-type contour detector is described in the publication, as shown in FIG. 8(a). A cylindrical detector element 51 is attached to the tip of each of a plurality of contact-swinging detection members 50. The detection members 50 are pivotally supported on their base ends by a support axle 52, such that the detector elements 51 are arranged side by side substantially in contact with one another along the axis of the log E. The amount of swing of the detection members 50 is detected by a linear encoder 53, which provides contour data consisting of a set of points on the log E at certain angular intervals (while in the illustrated example the 360° is divided into 36 equal sections for 10° intervals, this is only an example and the intervals are not particularly limited).

In this configuration, the cylindrical detector element 51 does not follow exactly the contour of the log E including a convex portion E1 and a concave portion E2, due to the geometrical characteristics of the detector element. The resultant contour data would thus represent a solid line f shown in FIG. 8(b), which is different from the real contour of the log as indicated by a broken line g. Thus, a most appropriate optimum yield axis that is desired cannot be obtained from such contour data. If the shape of the detector tool were to be modified such that the tool would follow even the bottom of the concave portion, the tool would be stuck with the concave or convex portions and the log would be prevented from rotating smoothly, thereby making the detection impossible.

Figure 9:
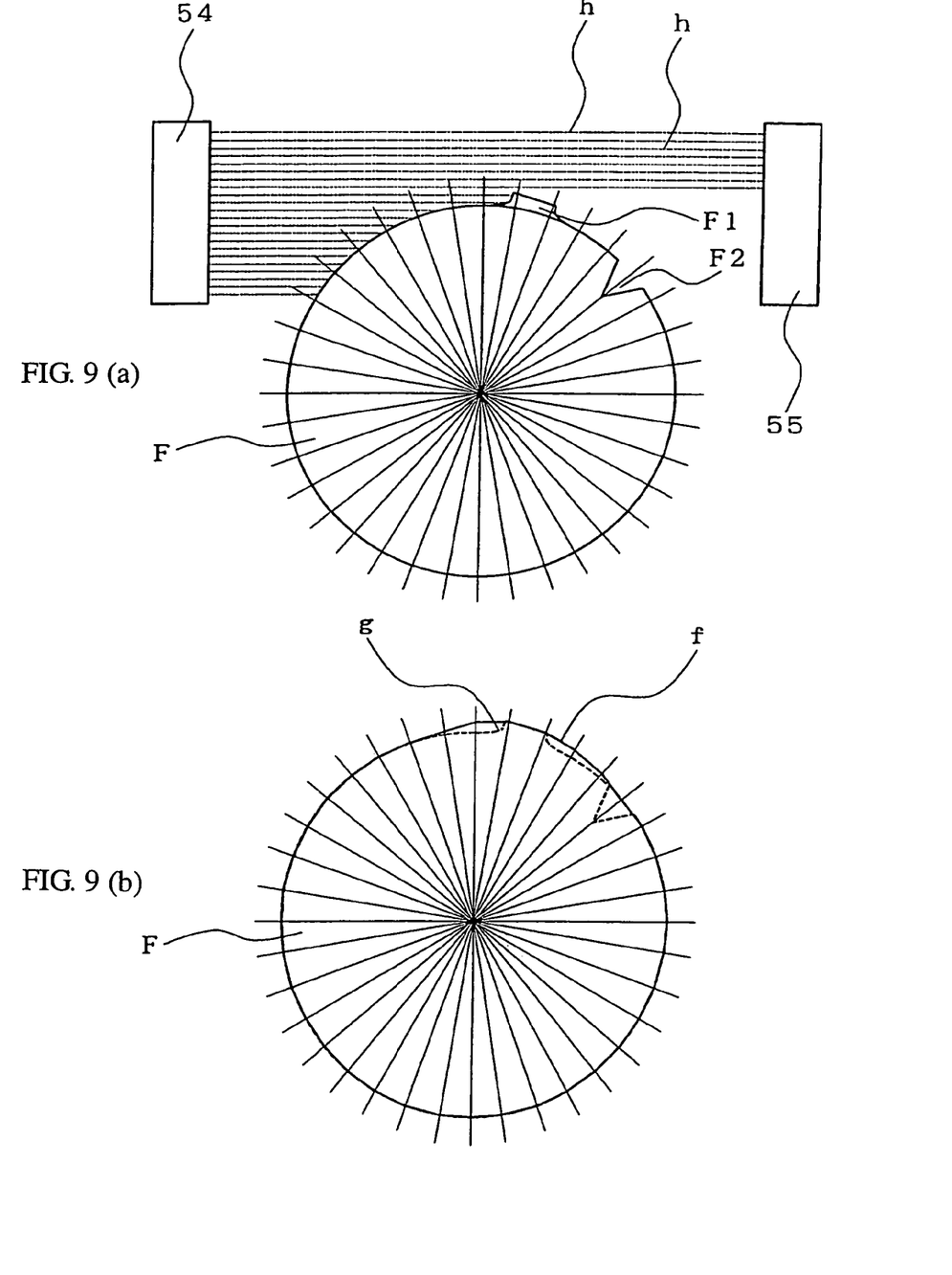
FIG. 9 is a schematic side view illustrating yet another method of centering a log according to the prior art.

Another example of the contour detector of the prior art relates to a light projector-receiver combination. Specifically, as shown in FIG. 9(a), a plurality of light projectors 54 and light receivers 55 are disposed in parallel along the axis of the log F. The blocking of a light beam h by the log F is detected by the light receivers 55 in order to obtain contour data as a set of points at certain angular intervals (10 degrees, in the illustrated example) on the log F. In this configuration too, the resultant contour data would represent a solid line f in FIG. 9(b) due to the characteristics of the light beam, which is different from the actual contour indicated by broken line g (with convex portion F1 and concave portion F2). Thus, this configuration is incapable of providing the most appropriate turning axle that is desired.

Figure 10:
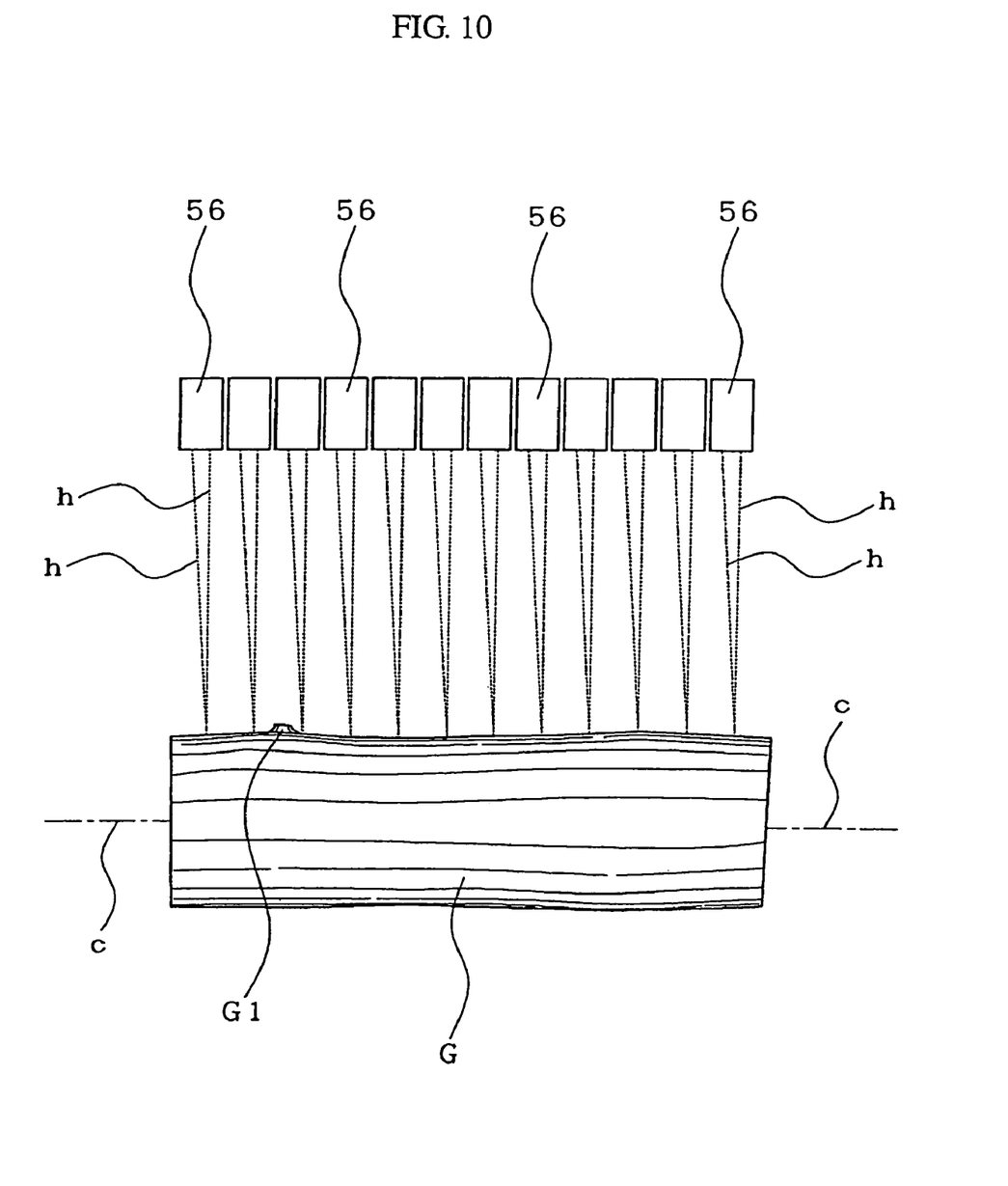
FIG. 10 is a schematic elevational view illustrating yet another method of centering a log according to the prior art.

In another example of the contour detector of the prior art, the publication describes a configuration in which an appropriate number of reflecting-type contour detectors 56 are disposed side by side such that the detecting direction of each detector is oriented towards the axis of the log G, as shown in FIG. 10. Thus, if a convex portion G1 or a concave portion (not shown) is appropriately located at positions where beams of light h are shone and received by the individual contour detectors 56, accurate contour data about the log G can be obtained. However, even if the contour detectors 56 are arranged closely side by side, as shown in FIG. 10, undetectable areas inevitably result, as in the case of FIG. 7. As a result, the problem of local detection failure occurs, which makes it impossible to determine an appropriate maximum radius of rotation. Even if it were possible to arrange the reflecting-type contour detectors such that their points of detection at certain intervals are arranged along the axis of the log substantially without any spacing therebetween, the resultant contour data would have an extremely large volume of data. As a result, it would take longer to process the data, the availability factor of the veneer lathe would worsen, and therefore such arrangement would be impractical.

Figure 11:
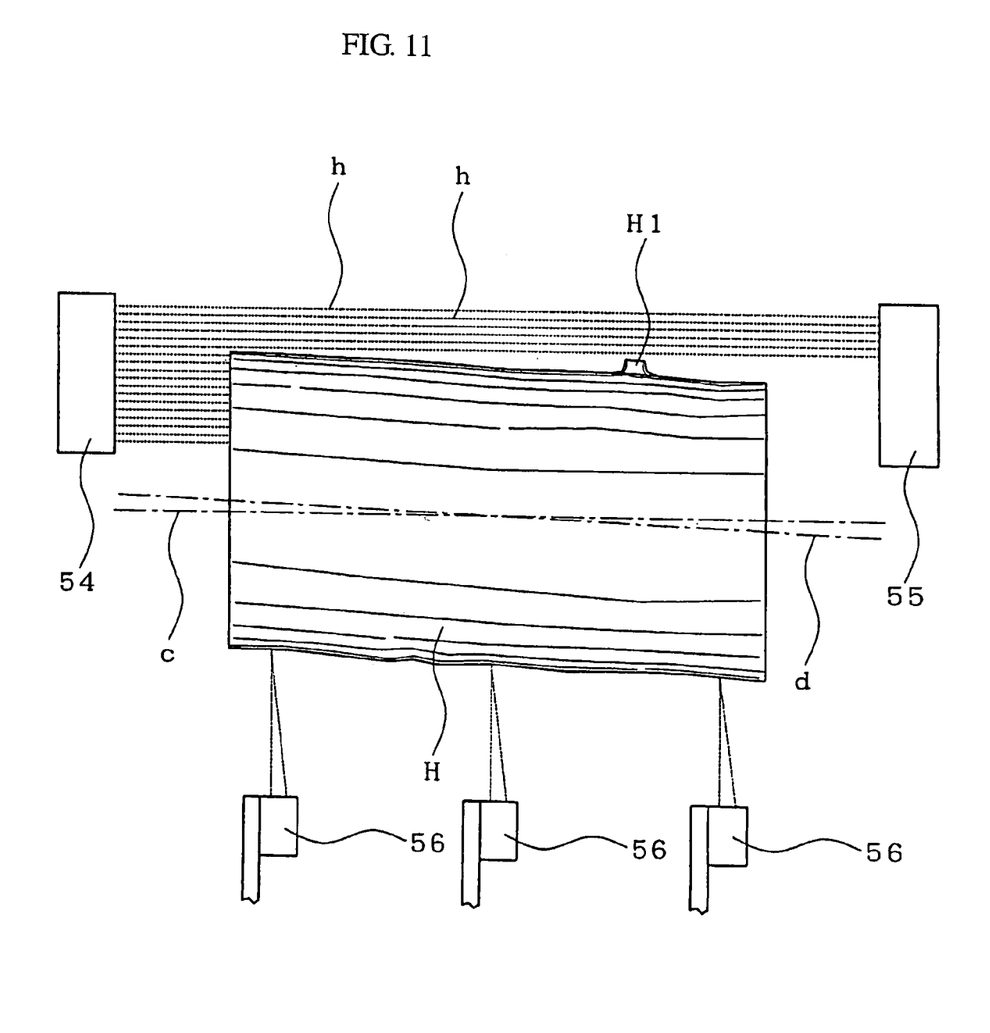
FIG. 11 is a schematic elevational view illustrating yet another method of centering a log according to the prior art.

Further, the aforementioned publication discloses that the multiple reflecting-type contour detectors 56 are arranged side by side such that their detection directions are oriented towards the axis of the log H, as shown in FIG. 11. A light projector 54 and a light receiver 55 are disposed opposite each other along the axis of the log H. Based on contour data provided by the contour detectors 56, the optimum yield axis d of the log H is determined, while the maximum radius of rotation of the log H is determined based on contour data provided by the light receiver 55. However, even in this configuration, a convex portion H1 would not be detected if it is hidden behind the beam of light h when the preliminary axis c is not aligned with an appropriate optimum yield axis d. In this case, the appropriate maximum radius of rotation cannot be determined either.

In order to overcome the aforementioned problems and disadvantages of the prior art, the invention provides a method (claim 1) of centering a log comprising the steps of rotating a log about a preliminary axis, measuring the contour of the log at intervals of desired rotation angles, and calculating, based on the measured contour data, a optimum yield axis suitable for the peeling of the log and a maximum radius of rotation of the log that corresponds to said optimum yield axis. The contour of the log that is used for calculating the optimum yield axis and the contour of the log that is used for calculating the maximum radius of rotation are measured separately. The contour for calculating the optimum yield axis is obtained in a fixed-point manner by measuring the log at a plurality of desired measurement points disposed at appropriate intervals along the axis of the log. The contour for calculating the maximum radius of rotation is obtained in a comprehensive manner by measuring the log in a plurality of measurement sections allocated along the axis of the log virtually without any gaps therebetween. The invention further provides a method (claim 2) of centering a log according to claim 1, wherein the contour for calculating the optimum yield axis of the log is measured at at least two measurement points near each end portion of the log. The invention additionally provides a method (claim 3) of centering a log according to claim 2, wherein the contour for calculating the optimum yield axis is measured additionally at one measurement point near a center portion of the log.

In order to implement the aforementioned methods, the invention provides an apparatus (claim 4) for centering a log, comprising: a pair of preliminary rotating axles disposed on either end face of a log that is supplied to a predetermined preliminary axis location, said preliminary rotating axles being adapted such that they can be brought closer to and away from each other, with at least one of the axles being rotated; a rotation angle detector for detecting the angle of rotation of the rotating axles; beam reflection scanners disposed at a plurality of desired positions along the axis of the log at appropriate intervals and near the periphery of the log supplied to the preliminary axis location, such that the detection direction of the distance detectors are oriented toward the axis of the preliminary axles; contact-swinging detection members disposed in a plurality of desired sections along the axis of the log, each member comprising a base portion pivotally supported by a support axle positioned near the periphery of the log supplied to the preliminary axis location, and a tip portion to which a detection element is attached such that the detection elements are arranged along the axis of the log virtually without any gaps therebetween and are adapted to be in contact with the periphery of the log; a plurality of swing angle detectors for individually detecting the amount of swinging of each detection member; and a centering computation mechanism for calculating a optimum yield axis suitable for the peeling of the log based on a detection signal supplied from the rotation angle detectors and contour data supplied from the distance detectors, and for calculating a maximum radius of rotation of the log that corresponds to the optimum yield axis based on contour data supplied from the swing angle detectors in addition to the detection signal and the contour data from the distance detectors. The invention further provides an apparatus for centering a log, wherein the beam reflection scanners are disposed at at least two positions near either end portion of the log. The invention additionally provides an apparatus for centering a log, wherein the beam reflection scanner is additionally disposed at one position near a center portion of the log. The invention further provides an apparatus for centering a log wherein the detection members comprise a planar detection element, and an apparatus for centering a log wherein the detection members comprise a cylindrical detection element.

DETAILED DESCRIPTION OF THE PREFERRED EMBODIMENTS

Figure 1:
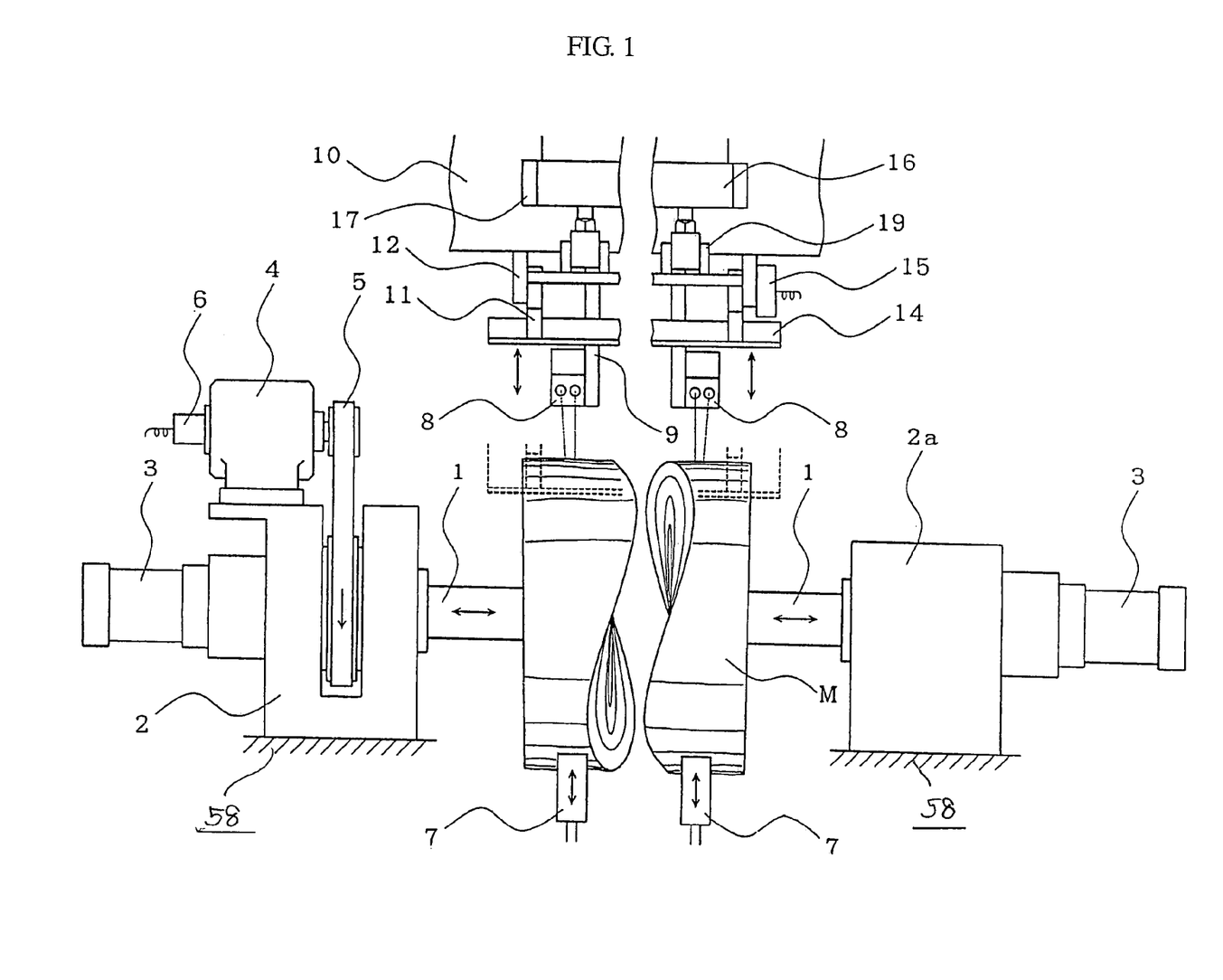
FIG. 1 is an elevational view of an apparatus for centering a log that is used for implementing a method of centering a log according to the present invention.
Figure 2:
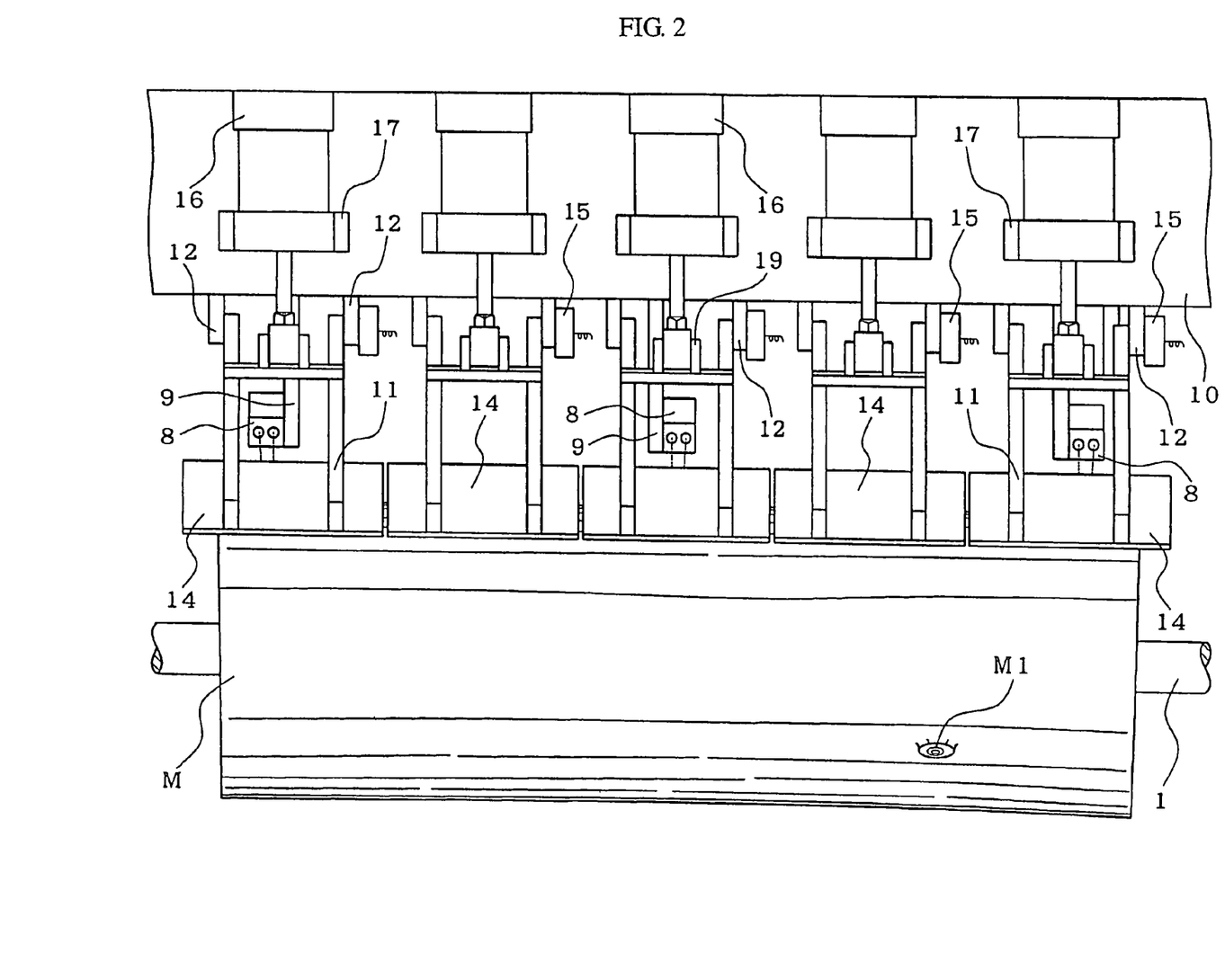
FIG. 2 is a partial elevational view of the apparatus for centering a log shown in FIG. 1.
Figure 3:
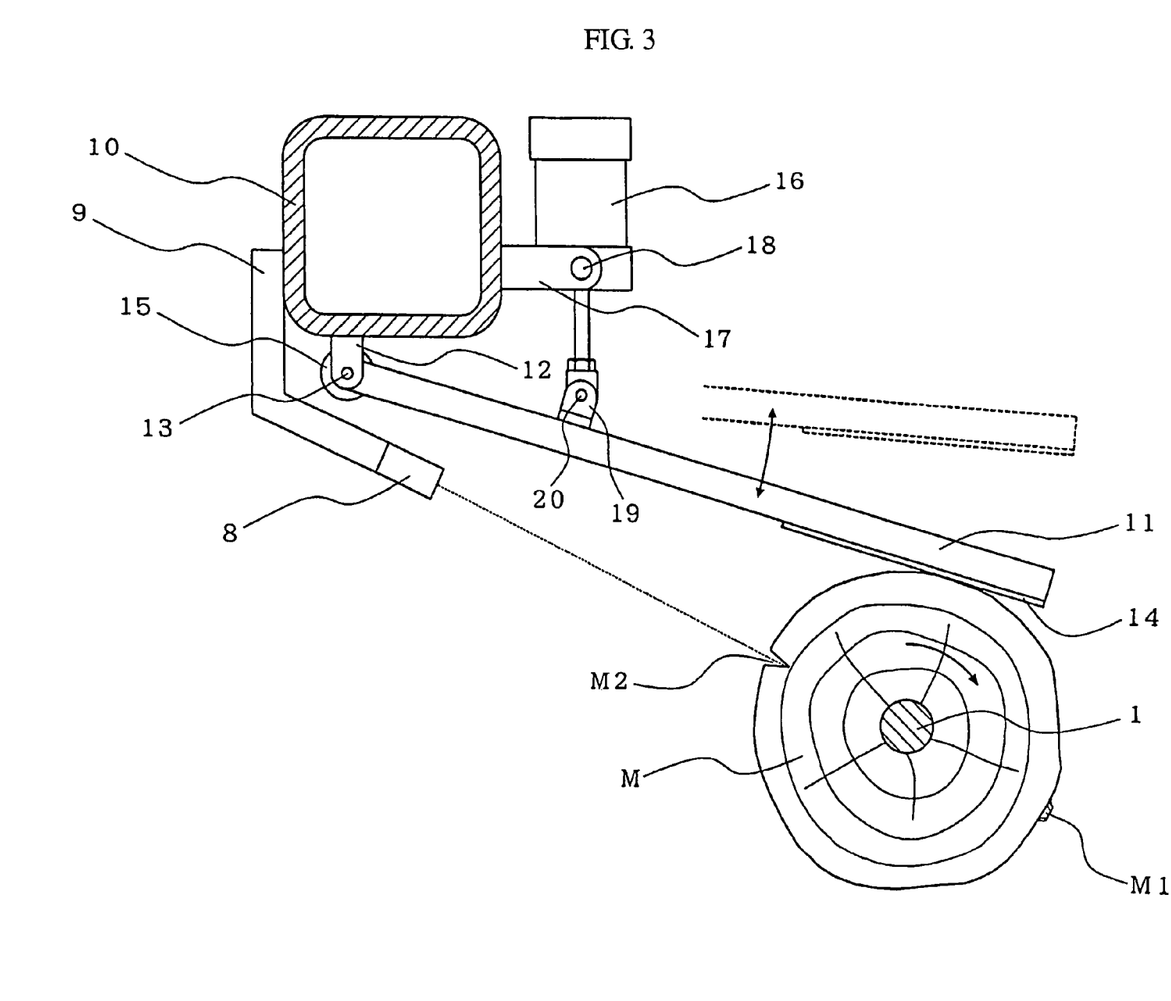
FIG. 3 is a partial side view of the apparatus for centering a log shown in FIG. 1.
Figure 4:
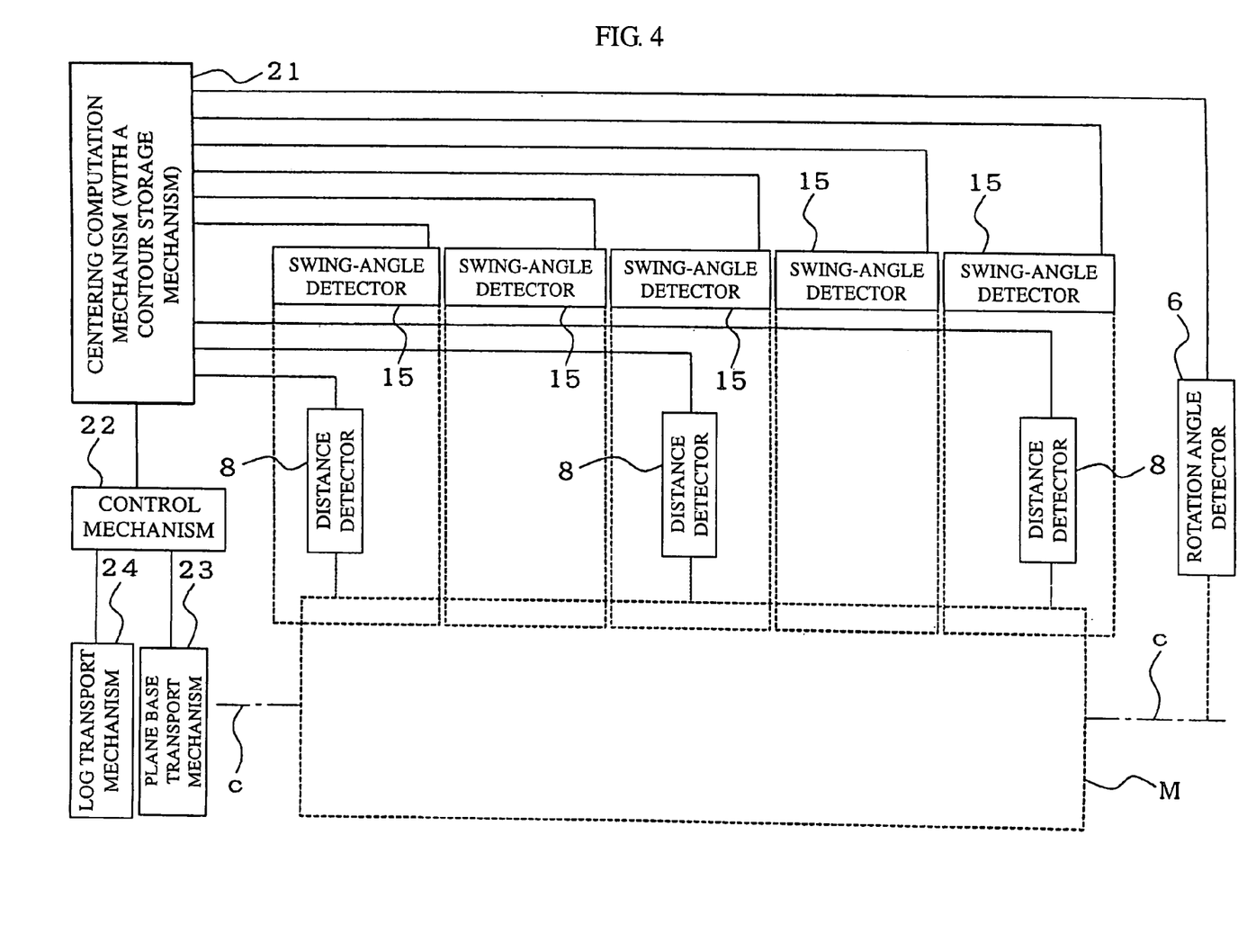
FIG. 4 is a schematic diagram of a control system of the apparatus for centering a log shown in FIG. 1.

The invention will be hereafter described by way of an embodiment with reference made to the drawings. For reasons of clarity, the members or materials or their similar members or materials that have been mentioned in the previous descriptions of the prior art will be designated with different numerals. FIG. 1 shows a front elevation of a log centering apparatus for implementing the method of centering of a log according to the invention. FIG. 2 shows a partial frontal elevation of the log-centering apparatus shown in FIG. 1. FIG. 3 shows a side view of the log-centering apparatus shown in FIG. 1. FIG. 4 shows a control system of the log-centering apparatus shown in FIG. 1.

In these drawings, numeral 1 designates a pair of preliminary rotating axles rotatably supported by bearing boxes 2 and 2a mounted on a frame 58 or the like (not shown). The preliminary rotating axles are adapted to move closer to or away from each other, as indicated by arrows in FIG. 1, by the operation of an actuator mechanism 3 made of a fluid cylinder or the like. At least one of the preliminary rotating axles, which is the case in the illustrated example, is rotatable in a direction indicated by another arrow in the figure by the operation of a drive source 4 via a transmission member 5 comprising a toothed belt, a chain or the like. The drive source is made up of a servomotor, an electric motor with a speed-change mechanism, or the like. The log M is supplied to a preliminary axis position by log supply elements 7, which are formed as V-shaped blocks and are freely movable up or down as indicated by arrows. The log M is then held between the preliminary rotating axles and rotated in the direction indicated by the arrow. Alternatively, the bearing boxes may be adapted to be independently movable horizontally and vertically as necessary, as will be described later, depending on the manner in which the log transport mechanism operates.

Numeral 6 designates a rotation angle detector consisting of a rotary encoder or the like mounted in the drive source 4. The rotation angle detector detects the angle of rotation of the preliminary rotating axles 1 and then transmits a detection signal to a centering computation mechanism 21, which will be described later.

Numeral 8 designates beam reflection scanners mounted at three locations on a support frame 10 via support arms 9. Specifically, two of the beam reflection scanners 8 are mounted at either end of the log M and the remaining one is disposed at a center portion of the log M. The detections directions of the three detectors are orientated towards the axis of the log. Thus, the beam reflection scanners measure the contours of the log M in a fixed-point manner at those three measuring points as the log is rotated about the preliminary rotating axis 1, and transmit contour data to the centering computation mechanism 21 for calculating the optimum yield axis of the log M, as will be described later.

Numeral 11 designates a plurality (5 in the illustrated example) of contact-swinging detection members disposed along the axis of the log M. Each detection member is pivotally supported at its base portion by a support element 12 and a support axle 13 rotatably fitted in the support element 12, which is secured to the support frame 10. Planar detector elements 14 are provided at the tip of the individual detection members 11 such that the detector elements 14 are disposed side by side virtually without any spacing therebetween along the axis of the log M as they come into contact with the periphery of the log. For the purpose of clarifying the swinging movement, the detection members 11 are shown in a raised position in FIG. 1, while in FIGS. 2 and 3 they are shown in a lowered position.

Numeral 15 designates a plurality (5 in the illustrated example) of swing-angle detectors consisting of a rotating encoder or the like, which are each mounted on the support element 12. The swing-angle detectors 15 detect the amount of swing of each detection member 11 via the support axle 13, and then transmits contour data to the centering computation mechanism 21 for calculating the maximum radius of rotation of the log M, as will be described later.

Numeral 16 designates lifting and lowering mechanisms each consisting of a fluid cylinder or the like. Each lifting and lowering mechanism 16 is pivotally supported by a holder element 17 secured to the support frame 10 and a holding axle 18 rotatably fitted in the holder element 17. The lifting and lowering mechanism 16 is further connected to the detection member 11 via a connector 19 and a connecting pin 20, for example. The lifting and lowering mechanisms 16 are operated to swing up (lift) the detection member 11 either manually or automatically using a control mechanism as necessary when, for example, supplying the log M to the preliminary axis position. If necessary, the lifting and lowering mechanism may be further provided with the function of forcibly pressing each detection member 11 (detection element 14) individually onto the log M.

Numeral 21 designates the centering computation mechanism, which may include a contour memory mechanism as necessary. The centering calculation mechanism calculates the turning axle suitable for the peeling of the log M based on detection signals from the rotation angle detector 6 and the contour data provided by each distance detector 8. Additionally, the centering calculation mechanism 21 calculates a maximum radius of rotation that corresponds to the optimum yield axis based on the contour data provided by the swing-angle detectors 15, as well as the detection signals from the rotation angle detector 6 and the contour data from the distance detectors 8. The resultant data concerning the optimum yield axis and the maximum radius of rotation that have been calculated is transmitted to a control mechanism 22 that controls the operation of a knife carriage transport mechanism 23 and a log transport mechanism 24, for example, which are known in the art, in a conventional manner.

The method of centering of a log according to the invention is implemented with the use of the log-centering apparatus as described above, for example. The log M is supplied to the preliminary axle position by the log supplying elements 7, and then held on both sides by the preliminary rotating axles 1. The log M is then rotated by the drive source 4 in the direction indicated by the arrow in the drawings. The angle of rotation of the preliminary rotating axles 1 (namely the rotation angle of the log M) is detected by rotation angle detector 6. At the same time, the contour of the log M is measured by the individual distance detectors 8, which provide contour data about the log M obtained at the three measurement points. The contour of the log M is further measured by the individual swing-angle detectors 15 via their individual detection members 11, so that the contour data about the entire regions of the log M along the axis thereof can be obtained at the same time.

At the three measurement points on the log, the detection directions of the beam reflection scanners are oriented towards the axis of the preliminary axles, such that the positions of those measurement points are stable without being influenced by the shape of the log. The beam reflection scanners thus measure the log at fixed points, so that they can obtain contour data that closely follows the actual contour of the log at all times even if a convex or concave portion of the log passes the measurement points. Using such contour data that closely reflects the actual contour of the log, the turning axle suitable for the peeling of the log can be more accurately determined than possible in the prior art. The contour of the log is further measured by the multiple swing-angle detectors (with their detecting members) at a plurality of sections of a large area all at once along the entire length of the log. Thus, any convex portions on the log can be detected, and therefore a suitable maximum radius of rotation of the log can be accurately calculated, which makes it possible to center the log more effectively than possible in the prior art.

The extent of accuracy to which the contour of the log should be measured may be controlled as desired by varying the rate (or frequency) at which the angle of rotation of the log is measured by the rotation angle detector. For example, by increasing the detection rate, contour data can be obtained that reflect the actual contour of the log more accurately. Conversely, if the detection rate is decreased, the convex or concave portion of the log would be measured less accurately. It goes without saying that the detection rate at which the distance detectors obtain the contour data to be used for the calculation of the optimum yield axis may be different from the measurement rate at which the swing-angle detectors (with their detection members) obtain the contour data necessary for the calculation of the maximum radius of rotation.

There is no particular limit as to the manner in which the optimum yield axis suitable for the peeling of the log or the maximum radius of rotation of the log are calculated based on the obtained contour data. Any calculation methods may be used, such as the known calculation methods that are typically used for the aforementioned processes, or any known mathematical calculation methods may be used. When calculating the optimum yield axis, there is obviously no need to count all of the contour data that have been obtained as calculation material. For example, the calculation method may exclude from the calculation material a partial, specific contour data that relates to a local convex portion, for example (formally, such contour data is included in the calculation material once and then removed later as necessary).

There is also no particular limitation as to the type of the beam reflection scanner. For example, it may employ a general-purpose light source that utilizes a beam of light such as laser, or it may be of the type that utilizes ultrasound. Any other various known types of detectors may be used. The position of the distance detectors is not particularly limited either. It is only necessary that they are disposed at at least two locations near the ends of the log. Preferably, an additional distance detector may be disposed at a location near the center of the log. If necessary, additional distance detectors may be further disposed at intermediate positions between the center and each end of the log.

The contact-swing detection member should preferably be constructed such that, as described in the embodiment, a planar detection element is attached to the tip of the member in order to allow the log to be rotated extremely smoothly. However, this is only an example and other structures may be employed. For example, a cylindrical detection element may be attached to the tip of the member, as shown in FIG. 8(a), or a semicylyndrical detection element, while not shown, may be attached to the tip of the member. Thus, the detection member may be constructed in any form as long as it does not block the rotation of the log significantly. There is also no particular limitation as to the number of divisions for the detection members. If there are too few divisions, the resultant contour data may have more than a little different values from the actual contour due to the distortion of the detection members. Conversely, if there are too many divisions, there would be more contour data than necessary and the data processing would be too much complicated. Thus, the number of divisions should be selected appropriately. As far as a log with a conventional length is concerned, it would be generally appropriate to set the length of one division to be at approximately 33 cm.

Figure 5:
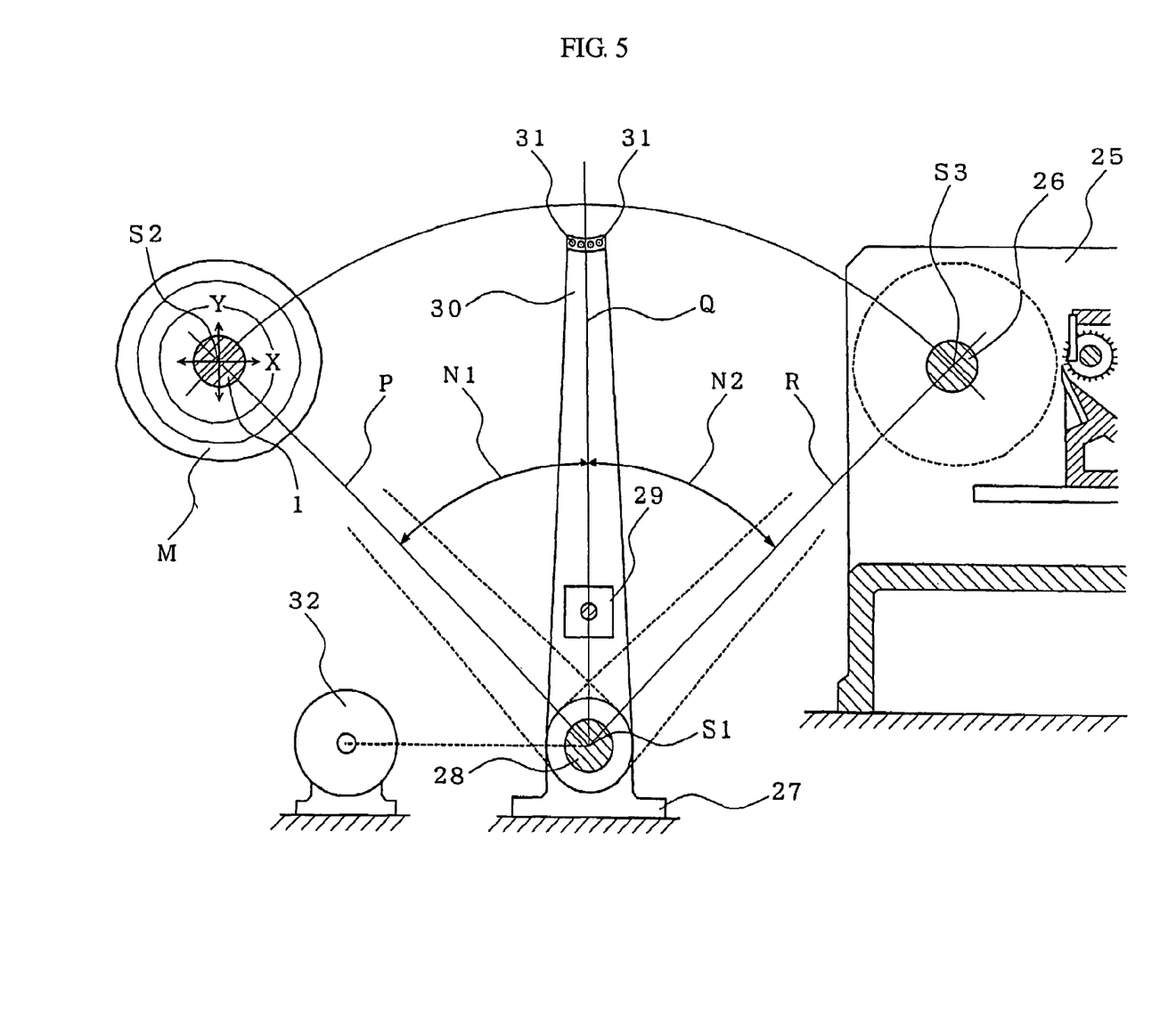
FIG. 5 is a side view of an example of a log transport mechanism installed in a later stage of the apparatus for centering a log according to the invention.

Further, there is no particular limitation as to the structure of the log transport mechanism for transporting a centered log from the centering device to the veneer lathe. Any of the known various types of log-transporting mechanisms may be used for the aforementioned purpose. An example is shown in FIG. 5. The illustrated transport mechanism, which is placed at an intermediated point between the centering device and the veneer lathe 25, comprises a pair of transport arms 30. An appropriate number of gripping claws 31 are attached to the tip of the arms 30. The base of each arm 30 is fitted on a support axle 28 pivotally supported by a support bearing 27, such that the arms 30 are slidable along the axis of the support axle 28. The transport arms 30 can be therefore brought closer to or distanced away from each other by the operation of an actuator mechanism 29 consisting of a fluid cylinder or the like. The transport arms 30 are moved by the operation of a drive source 32 consisting of a servomotor, an electric motor with a speed-reduction mechanism, or the like. Specifically, the arms 30 are moved as indicated by the arrows N1 and N2 in FIG. 5, from a supply start position P connecting a center S1 of the support axle 28 and a centering reference position (which is constant at all times) S2 of the centering device, to a supply standby position Q in the middle, and to a supply end position R connecting a center S1 of the support axle 28 and a center S3 of a spindle 26 of the veneer lathe 25. The arms 30 then return to the supply start position P, thus repeating the reciprocating motion together. There is also provided an appropriate actuator mechanism (not shown) whereby the preliminary rotating axles 1 can be independently shifted both horizontally (x direction) and vertically (y direction).

When the log-transport mechanism described above is used, the log M is centered by the aforementioned method, and then the preliminary rotating axles 1 are independently shifted horizontally and vertically by required amounts. Then, the position of the suitable turning axle of the log M that has been calculated is made to coincide with the centering reference position S2 of the centering device. The transport arms 30 that have been put on standby at the supply standby position Q are then rotated together to the supply start position P by the drive source 32, while the arms 30 are moved closer to each other by the actuator mechanism 29, thereby holding the log M from either side. The engagement of the log M between the preliminary rotating axles 1 is then released, and the transport arms 30 are rotated (after putting the arms on standby at the supply standby position Q, if necessary) together to the supply end position R by the drive source 32. The spindles 26 of the veneer lathe 25 are then actuated to hold the log M between them, before the transport arms 30 are brought away from each other by the actuator mechanism 29, thus completing the transport of the log M.

As already mentioned, the configuration of the log-transport mechanism is not limited to the above-described example, and various other known types of log-transport mechanism may be employed. For example, in one known configuration (not shown), the position of the log is changed such that the position of the appropriate turning axle of the log is aligned with a desired reference position during the transport of the log. In another known configuration, the log supply position is changed immediately before the end of the transport of the log such that the position of the appropriate turning axle of the log is aligned with the center of the spindles. Yet another example is disclosed in U.S. Pat. No. 6,176,282.

As described above, in accordance with the inventive method of centering of a log, in order to obtain the contour of the log on the basis of which the log's optimum yield axis is calculated, the log is measured in a fixed-point manner only at a plurality of certain desired measurement points that are disposed at appropriate intervals along the axis of the log. On the other hand, for obtaining the contour of the log for calculating the maximum radius of rotation, a large area of the log is divided into a plurality of measurement sections along the axis of the log with virtually no gap between them, and those sections are measured at once. Thus, the problems of the prior art that the contour data used for calculating the optimum yield axis differs from the actual contour, or that the contour of a convex portion of the log is missed in the contour data used for calculating the maximum radius of rotation of the log, can be prevented. In accordance with the invention, therefore, a generally more effective centering process can be performed than possible in the prior art. Further, the log-centering apparatus of the invention can implement the inventive method of centering of a log without any problems. In the configuration of the apparatus where a planar detection element is attached to the tip of a detection member, the log can be rotated extremely smoothly.

What is claimed is:

1. A log centering apparatus, comprising:

a pair of preliminary rotating axles rotatably supported by bearing boxes mounted on a frame of said log centering apparatus and disposed on either end face of a log, said preliminary rotating axles move horizontally by the operation of an actuator mechanism, and at least one of the axles is rotated by operation of a drive source;

a rotation angle detector mounted in the drive source, wherein the rotation angle detector detects an angle of rotation of the rotating axles;

a plurality of beam reflection scanners mounted on a support frame of said log centering apparatus and disposed at a plurality of positions along a horizontal axis of the log, wherein a detection direction of the beam reflection scanners is oriented toward the axis of the preliminary axles;

a plurality of contact-swinging detection members mounted on the support frame of said log centering apparatus and disposed at a plurality of positions along the horizontal axis of the log, each contact-swinging detection member comprising a base portion pivotally supported by a support axle positioned near the periphery of the log supplied to the preliminary axis location, and a tip portion to which a detection element is attached such that the detections elements are arranged along the axis of the log virtually without any gaps therebetween and are adapted to be in contact with the periphery of the log;

a plurality of swing angle detectors mounted on the support frame of said log centering apparatus, wherein the swing angle detectors individually detect the amount of swinging of each detection member; and a centering computation mechanism for calculating optimum yield axis suitable for the peeling of the log based on a detection signal supplied from the rotation angle detectors and contour data supplied from the beam reflection scanners, and for calculating a maximum radius of rotation of the log that corresponds to the optimum yield axis based on contour data supplied from the swing angle detectors in addition to the detection signal from the rotation angle detector and the contour data from the beam reflection scanners.

2. The log centering apparatus according to claim 1, wherein the beam reflection scanners are disposed at at least two positions near either end portion of the log.

3. The log centering apparatus according to claim 2, wherein the beam reflection scanner is additionally disposed at one position near a center portion of the log.

4. The log centering apparatus according to claim 1, 2 or 3, wherein the contact swinging detection members comprise a planar detection element.

5. The log centering apparatus according to claim 1, 2 or 3, wherein the contact swinging detection members comprise a cylindrical detection element.

6. The log centering apparatus according to claim 1, wherein the frame is integral with the support frame.

* * * * *